A. C. FREEMAN, Jr.
AREA FINDER APPARATUS.
APPLICATION FILED MAY 9, 1912.
1,076,275.
Patented Oct. 21, 1913.
2 SHEETS—SHEET 2.
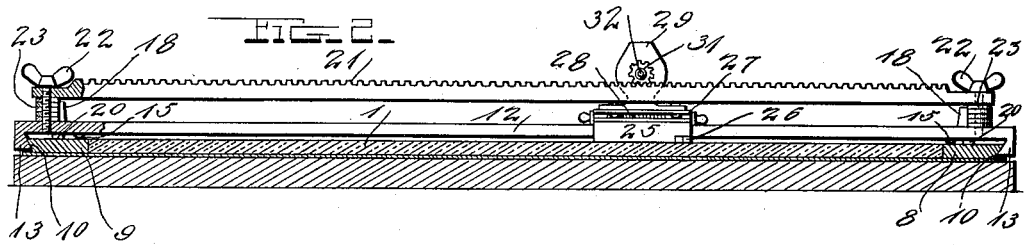
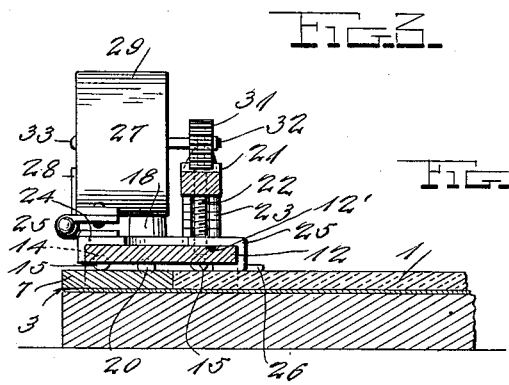
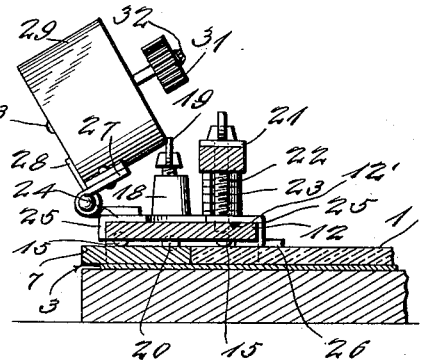
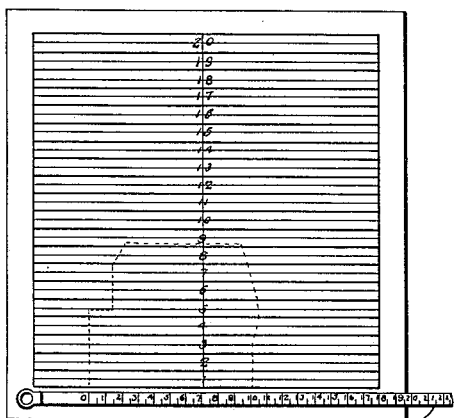
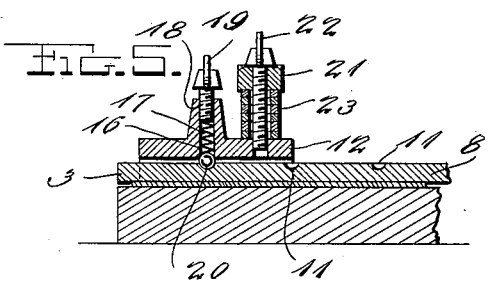
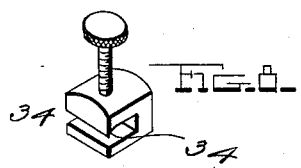
Witnesses
J. R. Pierce
S. M. McColl
Inventor
Arthur C. Freeman Jr.
by H. B. Willson & Co.
Attorneys

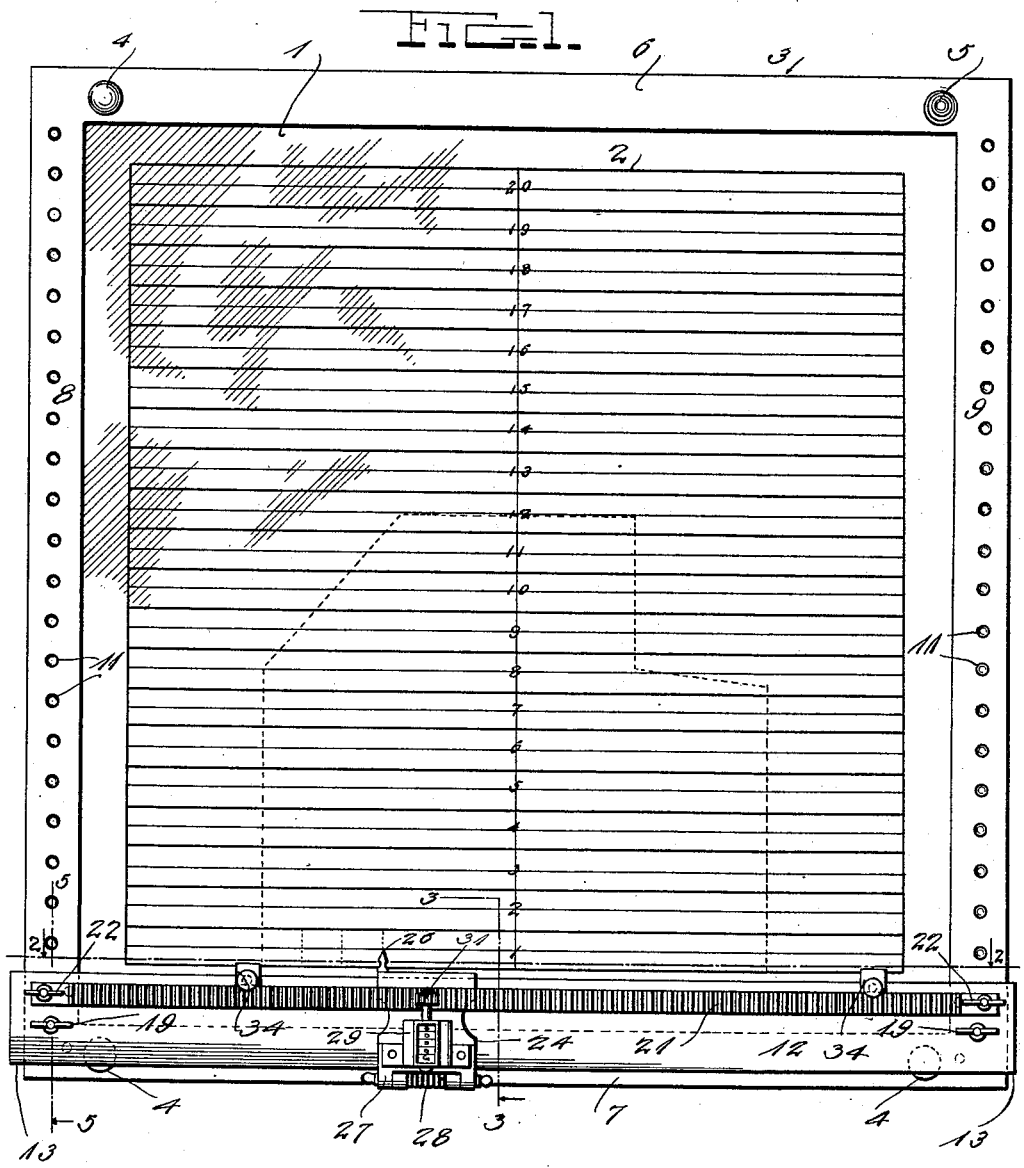

UNITED STATES PATENT OFFICE.

ARTHUR CLARICO FREEMAN, JR., OF NORFOLK, VIRGINIA.

AREA-FINDER APPARATUS.

1,076,275.  Specification of Letters Patent.  Patented Oct. 21, 1913.

Application filed May 9, 1912. Serial No. 696,248.

*To all whom it may concern:*

Be it known that I, ARTHUR C. FREEMAN, Jr., a citizen of the United States, residing at Norfolk, in the county of Norfolk and State of Virginia, have invented certain new and useful Improvements in Area-Finder Apparatus; and I do declare the following to be a full, clear, and exact description of the invention, such as will enable others skilled in the art to which it appertains to make and use the same.

This invention relates to improvements in measuring instruments and more particularly an instrument which may be used for ascertaining the area of flat surfaces having regular or irregular outlines and for other purposes.

The object of the invention is to provide simple and efficient means for measuring the area of flat surfaces of any scale required, and which is designed to show the result in different units of measuring as the particular case may require, and it is especially designed for use by civil engineers, real estate agents, marine and other engineers, or other persons desiring the measurement of flat surfaces converted to any other unit. A change from one unit to another is rendered possible because there is always a relation between the final result and the area measured which may be expressed by the length and width of a series of trapezoids which in this instrument adds up the amount of each trapezoid, recording a final expression in the terms desired. The instrument may therefore be used to not only read areas but also volumes, horse power directly from indicator cards, etc.

With these and other objects in view, the invention consists of certain novel features of construction, and the combination and arrangement of parts as will be more fully described and claimed.

In the accompanying drawings: Figure 1 represents a plan view of one of these improved instruments disposed in operative position ready for use; Fig. 2 represents a sectional view on line 2—2, Fig. 1. Fig. 3 represents a sectional view on line 3—3, Fig.
1. Fig. 4 is a view similar to Fig. 3, with parts in different position. Fig. 5 represents a sectional view on line 5—5, Fig. 1. Figs. 6 and 8 represent details. Fig. 7 represents a modified form of the apparatus in plan view.

In the form shown in Fig. 1 a transparent sheet or plate 1 is provided with a series of rectangles 2 formed by ruling said sheet with a number of parallel lines disposed at equal distances apart, twenty rectangles being here shown, and numbered in sequence. The lines forming the rectangles 2 are spaced at a certain distance which has direct bearing on the result to be read on the indicator to be described. This sheet 1 is preferably made rectangular or square, but may be of any other desired configuration, and is preferably composed of transparent celluloid. In this form of the invention a frame 3 is shown composed of metal or other suitable material, and of a shape to conform to the shape of the sheet 1, both of said members being here shown square. This frame 3 fits snugly around the edges of the plate or sheet 1 and may be quickly engaged with or removed from engagement with said sheet. This frame 3 is designed to be rigidly secured to a table or other supporting surface, preferably by means of thumb tacks 4 which pass through countersunk apertures 5 formed in the end members 6 and 7 of the frame. Any other suitable means, however, may be provided for securing the frame to the supporting surface. The side members 8 and 9 of the frame 3 have their outer edges beveled or inclined inwardly, as shown at 10, to form guides for a shiftable recording member to be described, which construction serves to keep the bar and frame from separating. The upper faces of these side members are provided with a plurality of longitudinally spaced alined sockets or seats 11 for a purpose to be described. These sockets or seats 11 are shown positioned to dispose the pointer of the recorder member opposite the center of the rectangles 2 on the sheet 1 when the frame is applied to the sheet in operative position. A bar 12 is slidably mounted on the side members 8 and 9 of the frame 3, being provided at its opposite ends with inturned beveled or dove-tailed flanges 13 which engage the beveled edges of said side bars and hold said bar against separation from said side bars but permit it to slide freely thereon. This bar is provided on its lower face adjacent its opposite ends with ball seats 14 to receive bearing balls 15 which facilitate the passage of said bar over the faces of the side bars 8 and 9. This bar is also provided on its lower face near opposite ends and at points opposite the sockets 11 with apertures 16 in which are mounted coiled springs 17 having balls in their outer ends which are adapted to engage the sockets or seats 11 in the side bars 8 and 9 and hold the bar in adjusted position on said side bars. The outer face of this bar 12 has sleeves or collars 18 arranged over the apertures 16, said sleeves being internally threaded to receive adjusting screws 19 for regulating the tension of the springs 17. These screws are preferably provided with wings to adapt them to be readily turned for adjusting the tension of the springs. Balls 20 are mounted in the outer ends of the coiled springs 17, and said springs exert their tension to project these balls outwardly and cause them to forcibly engage the sockets 11 in the side bars 8 and 9 when the bar 12 is shifted over said bars, and by means of which said bar 12 is held in adjusted position. A rack 21 is fastened to the upper or outer face of the bar 12, preferably by thumb screws 22, which engage screw threaded apertures in the bar near its opposite ends and on which are mounted a plurality of washers 23 which are preferably slotted transversely to adapt them to be slipped onto said screws 22 without removing the screws from the apertures in the bar. These washers are designed to space the rack the desired distance from the bar 12 for a purpose to be described. A member 24 is mounted to slide longitudinally on the bar 12, and is shown in the form of a plate having downwardly and inwardly turned flanges 25 which engage the opposite edges of the bar 12 to guide said member 24 thereon and prevent it from becoming accidentally detached therefrom. On the front edge of this plate 24 is a pointer 26 which, when the bar 12 is in correct position, follows along the center of the parallelograms 2 as the plate 24 is moved back and forth along said bar. Another plate 27 is hinged at one edge to the rear edge of the plate 24, and the pintle which connects said plates has a spring 28 positioned to hold the plate 27 normally in superimposed position on the plate 24. A register 29 is fixed to the upper face of the plate 27, and may be of any suitable or desired construction, the axle or shaft 30 thereof being preferably angular in cross section, and provided at its free end with a pinion or gear 31 which is adapted to mesh with the rack 21 and which gear has an angular hole punched therein to fit on shaft 30. This axle 30 of the register pinion 31 has a screw threaded aperture at the end with which a small thumb screw 32 is adapted to be engaged for holding said axle in operative position, and to permit its quick removal when it is desired to insert another pinion in its place having a different number of teeth. It will be understood that the register has an angular socket to receive the angular shaft or axle 30 of said pinion 31. A number of these pinions or gears 31 will be provided with each instrument, the diameter of the different pinions varying to suit the scale of the drawing and bearing such relation to the parallelograms 2 as to give the desired reading in the register 29. The teeth on the pinion 31 and those of the rack 21 are of the same pitch to adapt them to mesh easily and to turn said pinion when the plate 24 is shifted longitudinally on the bar 12, the spring 28 holding said pinion reliably in engagement with said rack and yet permitting it to be disengaged therefrom when desired, such for instance, as when moving the sliding plate to initial position after it has been moved on said bar 12 in forward direction or to the right. This register 29 is preferably provided with a spring pressed button 33 which may be depressed by the operator for reversing the numerical disks contained therein and turning them back to zero. The bar 12 has a groove 12' extending longitudinally of its upper face throughout the length thereof which is designed to receive depending projections in the form of lips 34' formed on the bar engaging face of the stops 34, and which prevent the stops from being moved laterally on the bar 12 and thereby accidentally disengaged therefrom.

The operation of this instrument as shown in Figs. 1 to 6 is as follows: The transparent plate 1 is placed on the table or other supporting surface over the top of the drawing or chart the area of which it is desired to determine, the lower edge of one of the rectangles 2 being superimposed over some prominent straight or curved line, as the case may be, of the drawing, the register having already been turned to zero. The pointer 26 is placed at the intersecting line at the center of a rectangle 2 with said prominent line of the survey. The plate 24 carrying the pointer 26 is then moved toward the right along the center of the rectangle. The pinion or gear 31 being in mesh with the rack 21 is rotated and the register is thereby caused to record during its movement. When the pointer reaches the outer boundary line of the chart being measured, which is disposed at the right thereof, the plate 27 is opened against the tension of the spring 28, thereby disengaging the pinion 31 from the rack 21, and the plate 24 is moved to the left or the initial position. The bar 12 is moved forward successively along the different parallelograms measuring the length of each parallelogram which is superimposed on the drawing, care being taken that the register registers when moved in one direction only, and the pinion thereof being disengaged from the rack on the return movement of the register. At the end of this operation the recorder will indicate the result desired, which may be in acreage or any other unit. This is rendered possible by the relation which is caused to exist between the distances over which the register is moved.

The reading on the indicator may be in acres or any other units and fractional parts thereof, and it is because maps and charts are made in different scales that the diameter of the wheel 31 must be varied to accommodate these scales.

In some cases not often found, there may be rectangles to be measured of exactly the same length, and when such is the case stops 34 are employed to economize in time in placing the pointer 26 in each case on the rectangle. These stops may be of any suitable or desired construction, and are preferably secured to the front edge of the bar 12 one being disposed at each side of the rectangle to be measured, and are adapted to engage the opposite ends of the plate 27 when the register is moved back and forth on the bar 12 as many times as the same measurement is to be taken. The stops 34 may then be removed and the bar 12 moved up to the point in which the width or length of the chart or rectangle is changed. and the usual method as above described is pursued.

In Fig. 7 another form of the invention is shown in which the register or indicator is shown in the form of a tape measure 35, which may be employed to accomplish the same result as the shiftable bar 12 mounted on the frame 3, and in this form of the invention the tape line or measure is graduated on one of its faces to a special scale, and the readings will produce the same result as the register 29. While the same result may be accomplished with the tape line as with the register, the latter is deemed a more accurate means of taking the record, but both fall within the scope of this invention.

I claim as my invention:

1. A measuring instrument comprising a transparent element having spaced parallel lines, a member movable in a direction at an angle to said lines, means for guiding said member and positively locking it at predetermined regular intervals, a measuring device movable on said member in a plane parallel with the lines on said element, and means for actuating said device.

2. An area finding instrument comprising a frame, a transparent element having spaced parallel lines thereon and adapted to be placed over the area to be measured with the lines intersecting the boundary lines of said area, a slidable member carried by said frame and movable in a direction at an angle to said parallel lines, means for guiding said member and positively locking it at predetermined regular intervals, a measuring device movable on said member parallel with said parallel lines for measuring the distance between said boundary lines in the spaces between said parallel lines, and means for actuating said measuring device as it moves on said member.

3. A measuring instrument comprising a transparent element having spaced parallel lines thereon, a bar slidable in one direction relatively to said transparent element, a registering device mounted on said bar and adapted to slide in a direction at an angle to the direction of movement of said bar, a rack on said bar, and a pinion on said registering device to engage said rack.

4. A measuring instrument comprising a supporting structure, a member movable in one direction over said structure, means for positively holding said member against accidental movement at predetermined intervals, a transparent element having spaced parallel lines and adapted to overlie the surface to be measured, a register carrier slidable on said member, a pointer upon said carrier to coact with said parallel lines, a register upon said carrier and coacting means on said register and said member for actuating the register.

5. An area finding instrument comprising a transparent sheet having spaced parallel lines thereon adapted to be placed over the surface to be measured, a frame adapted to engage said sheet and hold the sheet in fixed relation to said frame, a bar slidable in one direction on said frame, and a registering device mounted on and adapted to slide in a direction at right angles to the direction of movement of said bar and means for actuating said register to cause it to indicate the area of the surface measured.

6. An area finding instrument comprising a transparent sheet having parallel lines thereon and adapted to be placed over the surface to be measured, a frame adapted to engage said sheet and hold the sheet in fixed relation to said frame, and a registering device mounted on and adapted to be moved in directions at right angles to each other on said frame and means for actuating said register to cause it to indicate the area of the surface measured.

7. An area finding instrument comprising a transparent sheet having spaced parallel lines thereon and adapted to be placed over the surface to be measured, a frame adapted to engage said sheet and hold the sheet in fixed relation to said frame, a bar mounted to slide on the side members of said frame, said bar and side members being provided with coöperating means for yieldably holding the bar in adjusted position, and a register mounted to slide longitudinally on said bar, said register and bar being provided with coöperating means for turning the register shaft to cause it to indicate the area of the surface to be measured.

8. An area finding instrument comprising a transparent sheet having parallel lines thereon and adapted to be placed over the surface to be measured, a frame adapted to engage said sheet and hold the sheet in fixed relation to said frame, a bar mounted to slide on the side members of said frame, said bar and side members being provided with coöperating means for yieldably holding the bar in adjusted position, a register mounted to slide longitudinally on said bar, a rack bar mounted longitudinally on said sliding bar, and a pinion on the shaft of said register arranged in position to mesh with said rack whereby the register shaft is rotated during the movement of said register on said sliding bar.

9. An area finding instrument comprising a transparent sheet having parallel lines thereon and adapted to be placed over the surface to be measured, a frame adapted to engage said sheet and hold the sheet in fixed relation to said frame, a bar mounted to slide on the side members of said frame, said bar and side members being provided with coöperating means for yieldably holding the bar in adjusted position, a register mounted to slide longitudinally on said bar, a rack bar mounted longitudinally on said sliding bar, a pinion on the shaft of said register arranged in position to mesh with said rack whereby the register shaft is rotated during the movement of said register on said sliding bar, and spring pressed means for holding said pinion yieldably in engagement with said rack.

10. An area finding instrument comprising a transparent sheet having parallel lines thereon and adapted to be placed over the surface to be measured, a frame adapted to engage said sheet and hold the sheet in fixed relation to said frame, a bar having its opposite ends slidably engaged with the side bars of said frame, spring pressed members on the lower face of the opposite ends of said bar, the side members of said frame being provided with a plurality of longitudinally spaced alined sockets for the reception of said spring pressed bar carried members, a register longitudinally movable on said bar, and coöperating means on said bar and register for actuating the register when moved on said bar.

11. An area finding instrument comprising a transparent sheet having parallel lines thereon, a frame adapted to detachably engage said sheet and having parallel side members, a bar slidably mounted on said side members, means for holding said bar yieldably in adjusted position on said side frame members, a longitudinally disposed rack on said bar, a plate slidably mounted on said bar, a plate hinged to said sliding plate, a register fixed to said hinged plate, a removable actuating shaft in said register having a pinion in its outer end for engagement with said rack whereby said register is actuated on the movement of said sliding plate over said bar.

12. An area finding instrument comprising a transparent sheet having parallel lines thereon, a frame adapted to detachably engage said sheet and having parallel side members, a bar slidably mounted on said side members, means for holding said bar yieldably in adjusted position on said side frame members, a longitudinally disposed rack on said bar, a plate slidably mounted on said bar, a plate hinged to said sliding plate, a register fixed to said hinged plate, a removable actuating shaft in said register having a pinion in its outer end for engagement with said rack whereby said register is actuated on the movement of said sliding plate over said bar, and means for adjusting said rack bar relatively to said sliding bar to provide for the use of pinions of varying diameters.

13. An area finding instrument comprising a transparent sheet having parallel lines thereon and adapted to be placed over the surface to be measured, a frame adapted to engage said sheet and hold the sheet in fixed relation to said frame, a bar mounted to slide on the side members of said frame, said bar and side members being provided with coöperating means for yieldably holding the bar in adjusted position, a register mounted to slide longitudinally on said bar, said register and bar being provided with coöperating means for turning the register shaft to cause it to indicate the area of the surface to be measured, and stops removably mounted on said bar to limit the movement of said register in opposite directions.

14. An area finding instrument comprising a transparent sheet having parallel lines thereon and adapted to be placed over the surface to be measured, a frame adapted to engage said sheet and hold the sheet in fixed relation to said frame, a bar mounted to slide on the side members of said frame, said bar and side members being provided with coöperating means for yieldably holding the bar in adjusted position, a register mounted to slide longitudinally on said bar, said register and bar being provided with coöperating means for turning the register shaft to cause it to indicate the area of the surface to be measured, and stops removably mounted on said bar to limit the movement of said register in opposite directions, said stops each having a projection, and said bar having a groove for engagement by said projection.

15. An area finding instrument comprising a transparent sheet having parallel lines thereon and adapted to be placed over the surface to be measured, a frame adapted to engage said sheet and hold the sheet in fixed relation to said frame, a bar mounted to slide on the side members of said frame, said bar and side members being provided with coöperating means for yieldably holding the bar in adjusted position, a register mounted to slide longitudinally on said bar, said register and bar being provided with coöperating means for turning the register shaft to cause it to indicate the area of the surface to be measured, and stops removably and adjustably mounted on said bar for limiting the movement of said register in opposite directions, and means for preventing the lateral movement of said stops.

16. A measuring instrument comprising a supporting structure, a member movable in one direction over said structure, means for positively holding said member against accidental movement at predetermined intervals, a register slidable longitudinally on said member, and coöperating means on said member and register for actuating said register as it is moved on said member.

17. The combination of a supporting structure, a member movable in one direction over said structure, coöperating means on said member and structure for positively locking said member in adjusted position at regular intervals, a registering device movable on said member in a plane at an angle to the direction of movement of said member, and means for actuating said registering device as it is moved on said member.

18. The combination of a supporting structure, a member movable in one direction over said structure, means for guiding said member and positively locking it at predetermined regular intervals, a registering device movable on said member in a direction at an angle to the direction of movement of said member, a rack on said member and a pinion on said registering device to engage said rack.

19. The combination of a supporting structure, a member movable in one direction over said structure, means for guiding said member and positively locking it against accidental movement at predetermined regular intervals, a registering device movable on said member in a direction at an angle to the movement of said member, coacting means on the registering device and said member for actuating said device and an adjustable stop to limit the movement of the registering device on said member.

20. The combination of a supporting structure, a member movable in one direction over said structure, means for guiding said member and positively locking it against accidental movement at predetermined regular intervals, a registering device movable on said member in a direction at an angle to the movement of said member, a rack carried by said member and a pinion detachably connected to said registering device and engageable with said rack to actuate said registering device.

21. The combination of a supporting structure, a member movable in one direction over said structure, means for guiding said member and positively locking it against accidental movement at predetermined regular intervals, a registering device movable on said member in a direction at an angle to the movement of said member, a pinion upon the register and a rack removably mounted on the member and engageable by said pinion whereby the registering device is actuated.

22. The combination of a supporting structure, a member movable in one direction over said structure, means for guiding said member and positively locking it against accidental movement at predetermined regular intervals, a registering device movable on said member in a direction at an angle to the movement of said member, a pinion carried by the registering device and a rack adjustably mounted upon said member and engageable by said pinion, whereby the registering device is actuated.

23. The combination of a supporting structure, a member movable in one direction over said structure, means for guiding said member and positively locking it against accidental movement at predetermined regular intervals, a registering device movable on said member in a direction at an angle to the movement of said member, a rack upon said member, a pinion upon the register to engage said rack, whereby the registering device is actuated, and means for mounting the registering device for movement toward and away from said member, whereby the pinion may be engaged with and disengaged from the rack.

24. The combination of a supporting structure, a member movable in one direction over said structure, means for guiding said member and positively locking it against accidental movement at predetermined regular intervals, a registering device movable on said member in a direction at an angle to the movement of said member, coacting means upon the registering device and said member for actuating said device, and means upon the supporting structure, whereby it may be fastened over a sheet containing an object to be measured, to hold such sheet against accidental movement.

In testimony whereof I have hereunto set my hand in presence of two subscribing witnesses.

ARTHUR CLARICO FREEMAN, JR.

Witnesses:
EDITH GARLAND,
J. C. GRINNAN.